Jan. 17, 1933.  G. K. LEWIS  1,894,356
VEHICLE BODY CONSTRUCTION
Filed Feb. 20, 1929  4 Sheets-Sheet 1

Witness
William P. Kilroy

Inventor
George K. Lewis
By George J. Haight
Atty.

Jan. 17, 1933.                G. K. LEWIS                  1,894,356
                        VEHICLE BODY CONSTRUCTION
                   Filed Feb. 20, 1929      4 Sheets-Sheet  2
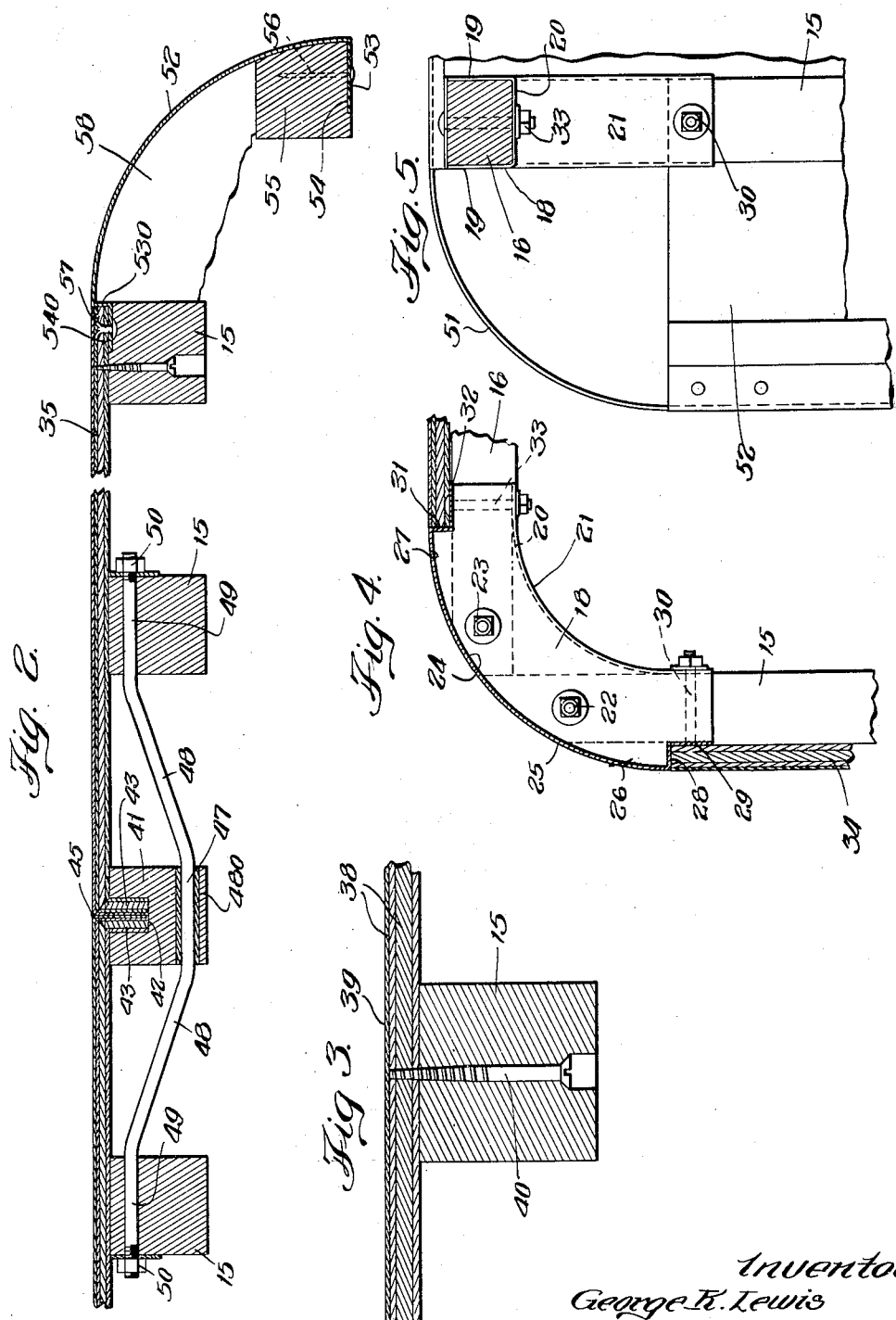
Witness
William P. Kilroy
Inventor
George K. Lewis
By George I. Haight
Atty.

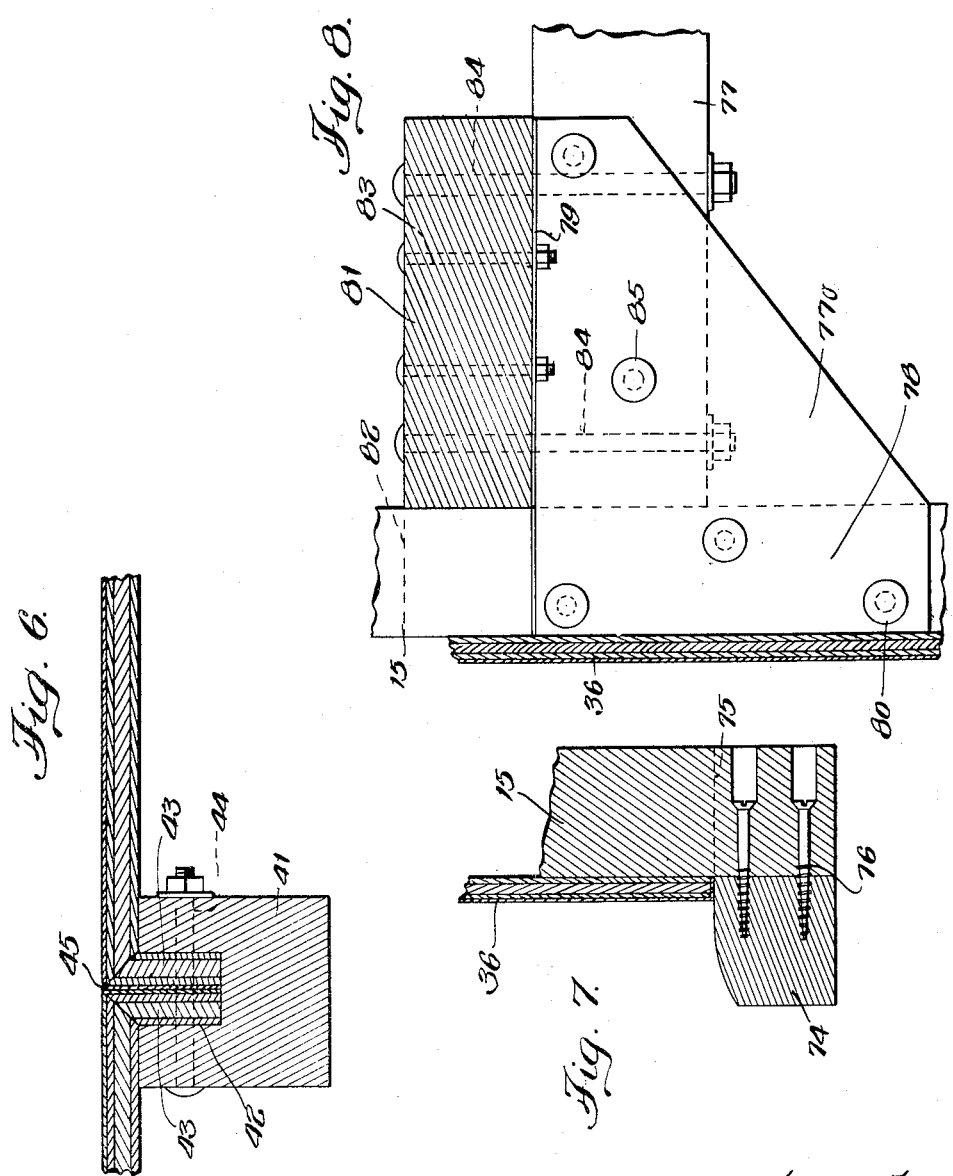

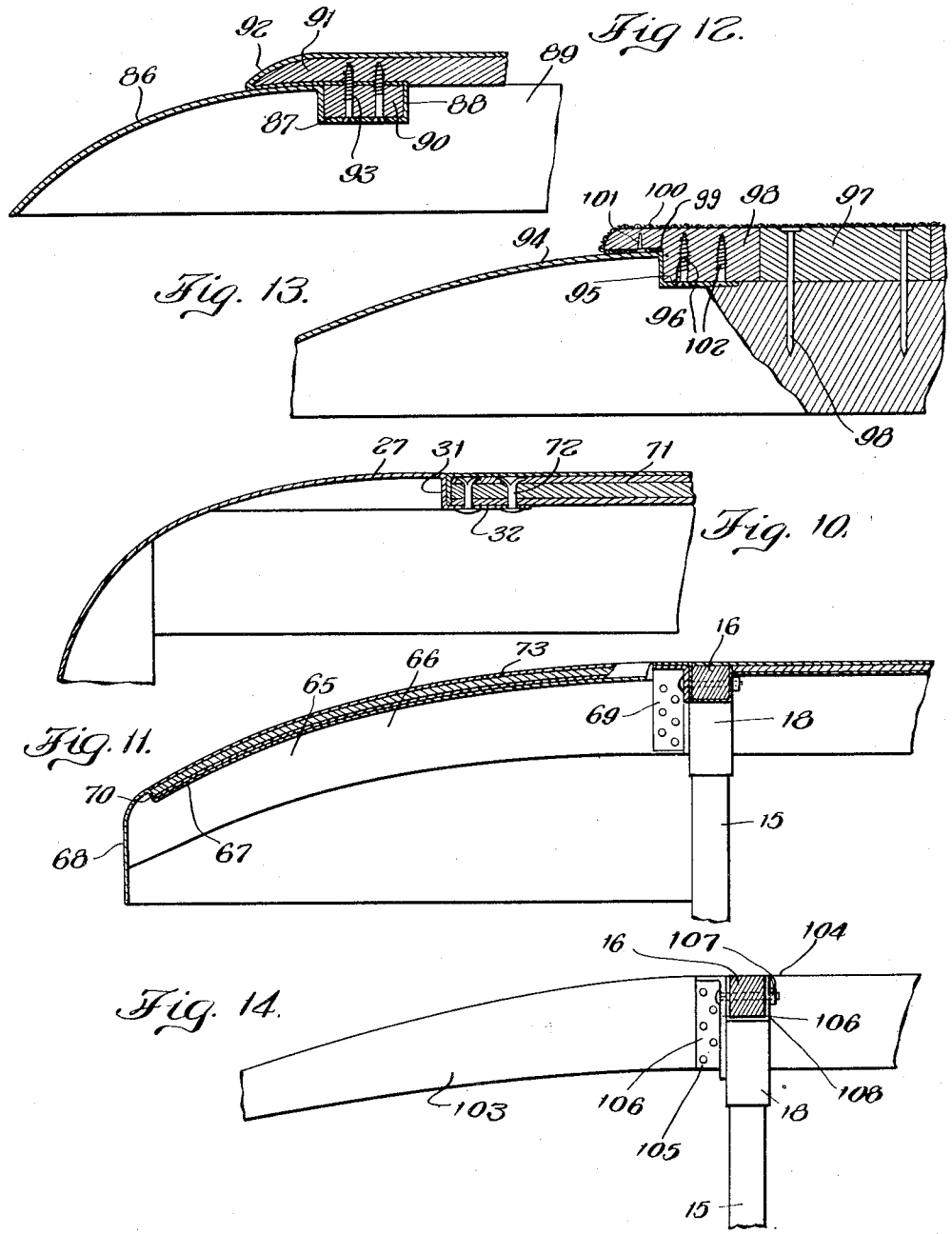

Patented Jan. 17, 1933

1,894,356

UNITED STATES PATENT OFFICE

GEORGE K. LEWIS, OF CHICAGO, ILLINOIS, ASSIGNOR TO MET-L-WOOD CORPORATION, OF CHICAGO, ILLINOIS, A CORPORATION OF ILLINOIS

VEHICLE BODY CONSTRUCTION

Application filed February 20, 1929. Serial No. 341,370.

This invention relates to vehicle body constructions.

An object of the invention is to provide a vehicle body construction of a closed type made up of laminated metal and wood panels, and wherein means are provided for fabricating panelled units to facilitate shipping and assembly, together with means for assembling units into a strong and attractive structure.

Another object of the invention is to provide a unitary side wall construction comprising a wooden framework and a metallic supporting rail secured thereto, together with laminated panels covering said framework and wherein the rail structure carries means adapted to form a rear corner construction and a forward overhanging cab construction.

A further object of the invention is to provide a side wall construction of the type indicated wherein a plurality of panels are secured to the frame and the meeting edges of the panels rigidly secured and braced so as to obviate unsightly joints and insure strong and rigid construction.

A still further object of the invention is to provide a vehicle body structure including side walls made up of panels of the character mentioned and wherein the panels are connected to roof supporting members through the medium of channel brackets arranged in such manner as to be rigidly secured to the rail members of the side wall sections.

Still another object of the invention is to provide a side and top wall arrangement wherein the supporting rails are so formed as to accommodate the panels of the side walls and the material forming the roof in positions to dispose the outer surface of said panels and material substantially flush with the outer surfaces of the rails of the side wall construction.

It is also an object of the invention to provide a rear wall construction including formed metallic corner members arranged in such manner as to be secured to the panels and associated rails of the side wall constructions.

Still another object of the invention is the provision of bracing means adapted for application between the main body portion and the rear wall, which result in imparting to the assembled arrangement great strength and rigidity.

Provision is also made for the adequate bracing of the lower ends of the side wall panelled constructions and for securing the same in position with reference to the framework of the vehicle to which the body is to be applied.

Other and further objects of the invention will more clearly appear from the description and claims hereinafter following.

Figure 2 is an enlarged fragmentary, horizontal, sectional view corresponding substantially to the line 2—2 of Figure 1.

Figure 3 is an enlarged fragmentary, sectional view corresponding substantially to the line 3—3 of Figure 1.

Figure 4 is an enlarged fragmentary vertical section corresponding substantially to the line 4—4 of Figure 1.

Figure 5 is an enlarged fragmentary, sectional view of the rear corner construction of the vehicle body.

Figure 6 is an enlarged horizontal sectional view corresponding substantially to the line 6—6 of Figure 1.

Figure 7 is an enlarged fragmentary, sectional view corresponding substantially to the line 7—7 of Figure 1.

Figure 8 is an enlarged, fragmentary, sectional view of the side and bottom arrangement of the side wall construction.

Figure 10 is an enlarged fragmentary, vertical, sectional view through the roof portion of the vehicle body.

Figure 11 is an enlarged fragmentary, longitudinal section through the forward portion of the vehicle body and disclosing means for supporting an overhanging arrangement for the cab.

Figure 12 is a view corresponding substantially to Figure 10 and showing a somewhat different embodiment of the roof structure.

Figure 13 is still another embodiment of the roof structure of the vehicle body.

Figure 1:
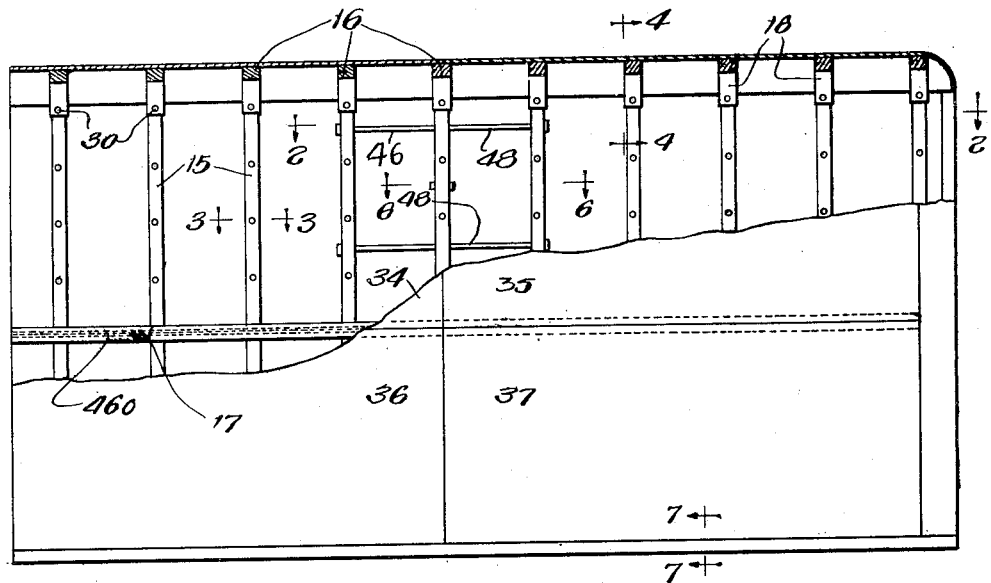
Figure 1 is a side elevational view of the vehicle body with part of the side wall of the same broken away to disclose the interior construction.

And Figure 14 shows a somewhat different type of overhanging cab structure.

As shown in the drawings and referring first to Figs. 1, 2, 4, 6 and 10, the vehicle body comprises generally opposite side wall structures, a roof structure and a rear end wall structure. Each of the side wall structures comprises a plurality of vertically extending members 15—15 adapted to co-operate and be secured to the horizontally extending roof members 16. The upright members 15, midway between their ends have secured thereto a horizontally extending frame member 17. The upper ends of the members 15 and the adjacent ends of the members 16 are connected together by means of a braced corner construction best shown in Figures 4 and 5. This construction includes for each set of ends of the cross-members 16 and uprights 15, a channel shaped bracket 18 having spaced flanges 19—19 within which the adjacent ends of the members are accommodated and a web 20, said web being disposed upon an arc indicated at 21. The flanges 19—19 of each angle member are secured respectively to the uprights 15 and cross members 16 by bolts 22 and 23. The corner portions of each adjacent set of ends of the members 15 and 16 are cut off as indicated at 24 to form an arc coinciding with the arc defined by an outer rail member 25. The rail member 25 extends longitudinally along the entire side of the vehicle body at its upper corner, and the arc upon which it is transversely curved is of such character as to provide portions 26 and 27 projecting respectively outwardly of each of the uprights 15 and cross members 16. At the extremity of the portion 26 the rail member 25 is provided with an inwardly offset web 28 terminating in a vertically extending flange 29 which is gained into the outer surface of each of the upright members 15, the flange 29 being disposed in line with the lower portion of the web 21 of each of the angle brackets 18 and is secured thereto by a bolt indicated at 30. The opposite edge portion 27 of the rail 25 is provided with an offset 31 and a flange 32, the latter being gained into the surface of the related cross member 16, there being a bolt extending through the flange 32 and each of the webs 21 of the brackets 18 as indicated at 33.

To each side wall structure, there are secured a plurality of panels, in the present embodiment of the invention, these panels numbering four and being indicated by the reference characters 34, 35, 36 and 37. As best shown in Figure 3 each of the panels comprises a plurality of layers of plywood indicated at 38 to the outer surfaces of which is secured a layer of sheet metal indicated at 39, the wood and metallic laminations of the panels being rigidly and permanently secured together by gluing. The panels fit against the outer faces of the uprights 15 and are secured thereto by a plurality of fastening elements 40 extended through each of the uprights and the plywood portion of each panel, confining the end of the fastening element to a point against, but inside of the outer metallic layer 39. The panels lie flat against the outer surfaces of the uprights 15 and flush with the outer surface of the top rail 25 by reason of the provision of the offset 28 in the rail member as will be appreciated.

As above stated, a plurality of panels are utilized for each side wall, this being necessary as it is impracticable to produce a single laminated panel of sufficient size to form one entire side wall of a large vehicle body. In order to obtain the effect of a complete panel, the meeting edges of the edges of the four panels illustrated are joined in such way that not only are the joints almost entirely concealed but the portions of the panels utilized for forming the joints arranged in such way as to augment the strength of the side wall construction.

Referring particularly to Figs. 2 and 6, one of the members 15 which may be designated by the numeral 41 is disposed in line with the meeting edges of all four panels at the central portion of the side wall structure. This particular upright is cut out so as to provide a groove 42 in its outer surface extending throughout the length of the upright. The adjacent edges of each pair of panels are provided with angularly disposed sections 43—43 which are turned to fit snugly within the groove 42 and a plurality of bolts 44 extended through the upright 41 and through the angular portions thereby not only clamping the panels to the upright but also clamping the panels together in such manner that only a slight crevice is apparent from the exterior of the panels, which crevice is filled with solder indicated at 45. The longitudinal edges of the panels are likewise provided with angularly disposed end portions of the same character before described which fit into the groove 460 of the horizontal member 17, being secured thereto by bolts, the angular portions, of course, being omitted where they cross the vertically extending angular portions 43—43. In each case the angular portions upon the panels are formed by sawing out a V-shaped notch in the plywood so as to permit bending of the panel without mutilation of the continuity of the outer metallic veneer of the panel. As an additional means of bracing the side wall construction, brace rods are provided as best shown in Figs. 1 and 2, these brace rods being indicated by the reference characters 46—46. Each of the brace rods has an offset body portion 47 extending through the upright 41, there being a sleeve 480 disposed about the rod at this point to minimize wear. At each side of the intermediate portion 47 the rod is provided with inclined portions 48—48 and end portions 49—49, the end portions extending through the adjacent uprights 15—15 and fixed in position by nuts 50—50.

Figure 9:
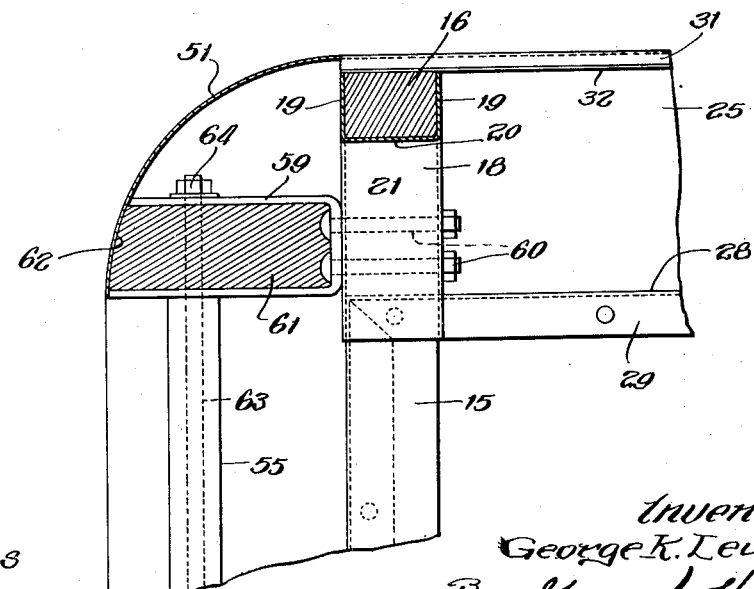
Figure 9 is an enlarged fragmentary sectional view, similar to Figure 5, and showing the braced rear end construction of the vehicle body.

Secured to the rear end of each of the rail members 25 is a top corner member 51 of metal. This corner member is preferably a stamping in the form of a segment of a sphere, the edges of the same adjacent the rail being welded thereto, while the opposite edges are thus disposed in position to be welded to a metallic corner member 52 (Figs. 2, 5 and 9). Each of the corner members 52 is arcuate in shape and extends vertically, having a flange 53 which is gained into the surface 54 of the corner post 55 and secured thereto by fasteners 56. The opposite end of the corner post member 52 is provided with an inwardly offset web 530 and an angular flange 540, this portion of the corner post member being formed in the manner indicated to accommodate the side panels 35 and 37, being secured to said panels by split rivets indicated at 57. As before stated, the corner brackets 51 are welded to the upper end portions of the corner post members 52. The lower ends of the corner post members 52 are each provided with an inturned flange 58 which may bear upon the bed of the vehicle, and secured thereto if desired.

For the purpose of bracing the rear corner construction, bracing means are provided as best shown in Fig. 9. A channel member 59 is disposed along the rear surfaces of the rearmost uprights 15—15, and is secured by means of bolts 60 extending through the angle brackets 18 and the web of the channel member. Accommodated within the channel section is a wood member 61, the outer edge of which is curved as indicated at 62 to conform to the curvature of the corner cap 51. The channel member 59 and wooden member 61 are disposed to rest upon the upper end of the adjacent corner post 55, the post being provided with a groove to accommodate a tie rod 63 extending the entire length of the corner post and through the flanges of the channel member 59 as well as through the wood member 61, being secured in position by the nut 64.

Disposed at the forward end of each rail 25 is an extension member 65 adapted to form a support for the roof of the cab portion. This extension member has a side wall 66, a top 67 and end wall 68. The side wall 66 may have an angle bracket 69 riveted thereto and adapted to be secured to the angle bracket 18 at the front of the body. The top wall 67 is offset inwardly as indicated at 70 to provide a socket portion for the reception of the covering panel. The opposite side rail will have a similar construction as will be understood.

The roof arrangement in the preferred form of the invention comprises a plurality of panels indicated at 71 and best shown in Figures 4 and 10. The roofing panels will be of such size as to fit nicely within the depression provided by the web portions 31 of each of the rail members 25 being secured to the flanges 32 of said members by means of rivets 72. The panel 73 which extends over the overhanging members 65 will be curved and fit within the offsets 70 provided in said members.

At the lower ends of the uprights 15—15 is provided a buffer member best shown in Figure 7. The buffer member comprises a longitudinally extending stringer 74, and projects outwardly beyond the side wall structure. It is provided at intervals corresponding to the disposition of the uprights with cut-outs for the reception of the same, indicated at 75 and is secured to the lower extremities of said uprights by screws 76, the upper surface of the outwardly projecting part of the stringer forming a support for the lower ends of the panels 36 and 37.

In order to provide means for supporting the body construction upon the bed of the vehicle, a construction is provided such as that shown in Figure 8. In said figure, the cross pieces of the platform of the vehicle are indicated by the reference characters 77, and it will be appreciated that a plurality of such cross-pieces extend at intervals throughout the length of the vehicle platform. The supporting means for the vehicle body include brackets 770, each having a vertically extending flange 78 and a horizontally extending flange 79. The vertical flange 78 is secured to the lower end of the adjacent member 15 by rivets or bolts indicated at 80. Bearing upon the horizontal flanges of the bracket 770 is a bottom rail member 81, said rail member being notched out as indicated at 82 to accommodate the adjacent portions of the uprights 15—15, the oak rail extending longitudinally the full length of the body construction and being secured to the flanges of the brackets by bolts 83. The oak rail 81 in turn rests upon the cross bar 77 and bolts 84 are utilized for securing the oak rail to the cross bars. Additionally, the vertical flange 78 is secured to the cross bar 77 by bolts 85.

By the above described arrangement, it will be appreciated that side wall members are provided which are complete in themselves, consisting of the uprights 15—15, the top rail member, the rear corner construction, the forward cab overhang, and the bumper members 74. These panels can be assembled and shipped as units or the framework may be made up so as to be complete except for the provision of the panels which may be added later. By reason of the construction between the top rails and the roof members a strong and rigid construction is provided in the assembled body. Further, the roof structure is of such character as to fit within the recesses provided therefor so as to present an attractive, unmarred surface. The side wall panel construction provides practically complete units and means are provided for readily assembling the same with the roof of the vehicle body and for mounting the same with respect to the vehicle platform.

Referring now to Fig. 12, a somewhat different embodiment of the roof structure is provided. In this structure, rails indicated at 86 are provided corresponding to the rails 25 heretofore described in detail. Each rail 86 is offset as indicated at 87 to fit within a groove 88 in the roof member 89, and the offset and grooved portions accommodate a longitudinally extending strip of material 90. The roof proper is formed by a wood core 91 over which is extended covering fabric 92, the ends of which are clamped between the material 91, and the upper portion of the rail 86 and the strip 90, the screws 93 being utilized and extending through the strip, through the covering material and into the roof material 91. It will be understood that all edges of the roof structure are constructed in a similar manner.

In Fig. 13 still another embodiment of the roof structure is disclosed. In this form of the invention, the rail 94 is provided with an offset 95, bearing against the cross members indicated at 96. A plurality of longitudinally extending boards 97 are utilized for the roof proper and nailed to the members 96 by nails 98. The outer boards of the roof indicated at 98 are cut out as at 99 and the cover material 100 is stretched over the boards and tucked under the offset portion 99 and secured by tacks 101. The boards 98 are then secured in position by means of the screws 102.

Referring now to Fig. 14, a somewhat different embodiment of the supports for the cab portion of the vehicle is contemplated. In this construction, the extensions 103 may be of wood and secured to the side rails 104 by bolts 105. The bolts 105 also serve to secure one flange 106 of an angle bracket to the extension 103, the opposite flange 106 being secured by bolts 107 to the adjacent angle bracket 108 corresponding to the angle brackets 18.

While I have herein shown and described what I now consider the preferred manner of carrying out my invention, the same is merely illustrative and I contemplate all changes and modifications that come within the scope of the claim appended hereto.

I claim:—

In a vehicle body construction having side walls and a roof; of formed metallic corner members; corner posts arranged within said corner members; channel means secured to said side members and extending into supporting relation with said corner posts; a filler block disposed within said channel member; and tie rods extending through said channel member, filler block and corner post.

In witness that I claim the foregoing I have hereunto subscribed my name this 18th day of February, 1929.

GEORGE K. LEWIS.